(12) United States Patent
Metzler et al.

(10) Patent No.: US 11,159,530 B2
(45) Date of Patent: Oct. 26, 2021

(54) DIRECT UPLOAD AND DOWNLOAD TO CONTENT MANAGEMENT SYSTEM BACKEND

(71) Applicant: Nuxeo Corporation, Brooklyn, NY (US)

(72) Inventors: Damien Metzler, Irvine, CA (US); Benoit Delbosc, Loos (FR); Florent Guillaume, Paris (FR); Thierry Delprat, Brooklyn, NY (US)

(73) Assignee: NUXEO CORPORATION, Brooklyn, NY (US)

( * ) Notice: Subject to any disclaimer, the term of this patent is extended or adjusted under 35 U.S.C. 154(b) by 359 days.

(21) Appl. No.: 16/250,782

(22) Filed: Jan. 17, 2019

(65) Prior Publication Data
US 2020/0236110 A1    Jul. 23, 2020

(51) Int. Cl.
*H04L 29/06* (2006.01)
*G06F 21/45* (2013.01)
*H04L 29/08* (2006.01)

(52) U.S. Cl.
CPC .............. *H04L 63/10* (2013.01); *G06F 21/45* (2013.01); *H04L 63/0876* (2013.01); *H04L 67/42* (2013.01); *H04L 67/10* (2013.01)

(58) Field of Classification Search
None
See application file for complete search history.

(56) References Cited

U.S. PATENT DOCUMENTS

| 2004/0054629 A1* | 3/2004 | de Jong | ................ | H04L 9/3213 |
| | | | | 705/51 |
| 2011/0246294 A1* | 10/2011 | Robb | ................ | G06Q 30/0254 |
| | | | | 705/14.52 |

* cited by examiner

*Primary Examiner* — William J. Goodchild
(74) *Attorney, Agent, or Firm* — Kacvinsky Daisak Bluni PLLC

(57) ABSTRACT

Described is a content management system (CMS) arranged to provide a client device direct access to backend storage resources for the client device. The disclosed CMS can provision a transient storage bucket on backend storage resources for the CMS and provide the client device access credentials to upload digital content directly to the transient storage bucket. The CMS can cause the uploaded digital content to be replicated from the transient storage bucket to a persistent storage within the backend storage resources and can update the CMS based on the uploaded digital content. Additionally, the CMS can provide access credentials for the client device to download digital content directly from the backend storage resources for the CMS.

22 Claims, 12 Drawing Sheets

System 100

DIRECT UPLOAD AND DOWNLOAD TO CONTENT MANAGEMENT SYSTEM BACKEND

TECHNICAL FIELD

Embodiments described herein generally relate to content management systems and particularly to uploading and downloading directly to and from a backend for the content management system.

BACKGROUND

The modern computing era has brought with it a proliferation of digital content. Management and organization of this exponentially increasing amount of digital content is facilitated through content management (CM) systems (CMSs). In general, a CMS can support creation, modification, and/or hosting of different types of digital content.

A CMS can be implemented from a number of computing configurations (e.g., servers, data centers, Cloud computing providers, or the like), sometime referred to as the backend of the CMS. The CMS often provides access (e.g., upload and download) to digital content managed by the CMS. It is to be appreciated that uploading and downloading a large digital content file or a large number of digital content files is limited by the network connection between the CMS and the client. The present disclosure is directed to providing direct upload and download pathways into the backend of the CMS.

DETAILED DESCRIPTION

Figure 1:
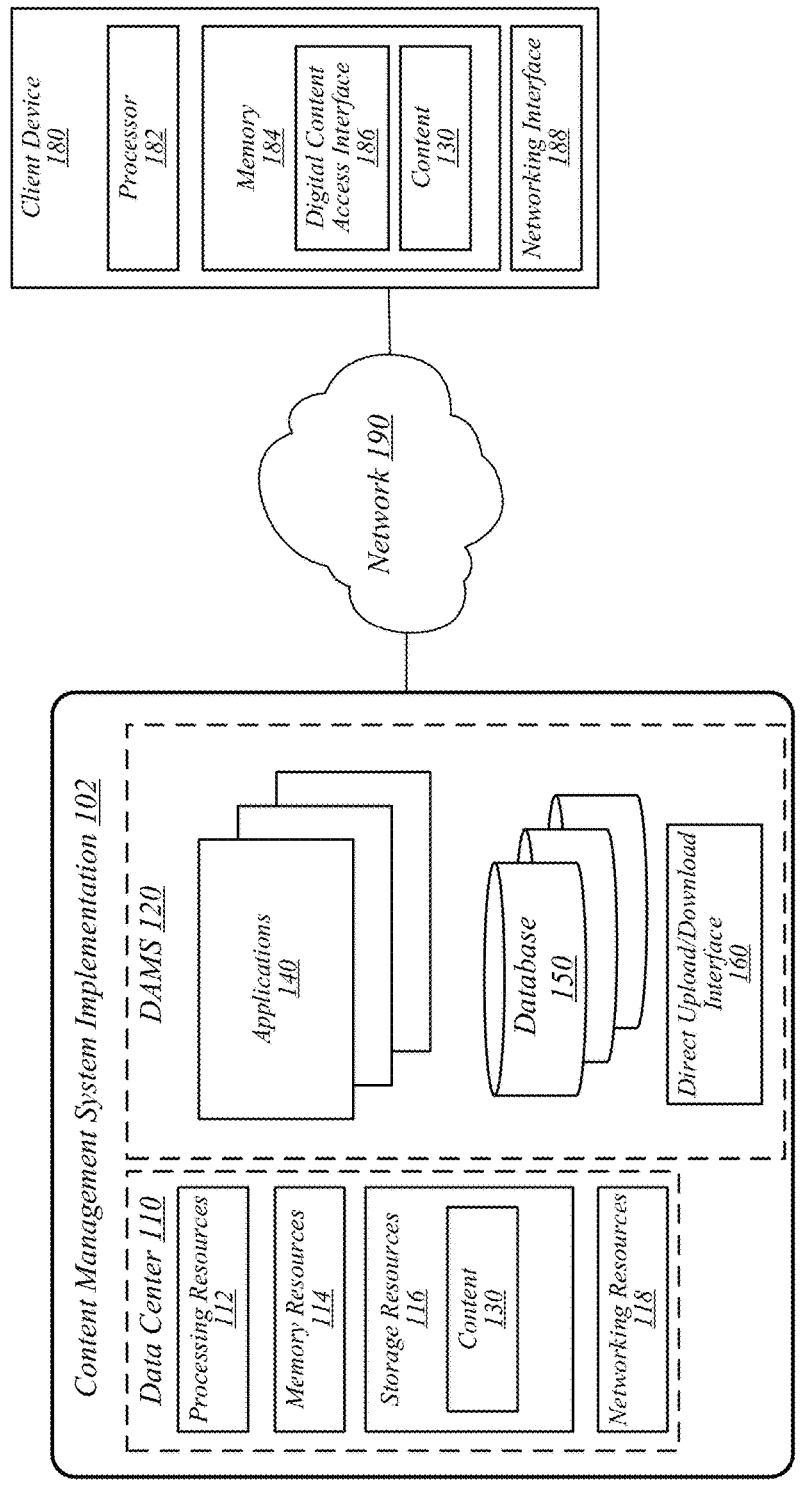
FIG. 1 illustrates an example system including a DAMS and client device.

In general, a CMS manages digital content. A number of types of CMSs are available, such as, for example, a web content management system (WCMS), a digital asset management system (DAMS), a document management system (DMS), enterprise content management (ECM), media asset management (MAM), etc. A CMS typically provides for the creation, modification, management, and/or hosting of various types of "digital content" or digital data. For example, a CMS could provide for management of documents, images, videos, maps, program code, etc. Additionally, for each of the various content types, the CMS can provide format management, versioning, history, indexing, searching, retrieval, etc.

A CMS can be executed or provided by a variety of computing configurations. For example, a CMS can be provided by a server, a data center, a Cloud computing service, or the like. It is to be appreciated, that due to the management of digital contents, the storage requirements for a CMS can be significant (e.g., many petabytes, etc.) Accordingly, storage resources for a CMS are often implemented by a "backend" service, which can be a data center, a number of distributed data centers, a Cloud storage provider, or the like. Adding or accessing digital content to or from the CMS conventionally involves moving the data from the backend to the CMS and then to the client, or vice versa. For example, downloading digital content conventionally involves the CMS retrieving the digital content from the backend storage resources and then providing the digital content to the client device.

When a CMS is deployed, computing resources (e.g., processing resources, memory resources, etc.) are allocated for an anticipated computational load. However, during periods where digital content is uploaded to or downloaded from the CMS, the allocated computing resources may be idle. It is to be appreciated that moving files through the CMS is heavily dependent upon the client device bandwidth. This issue is compounded where the CMS is deployed in the Cloud, where the client device accesses the CMS through the public Internet, and/or where network access by the client device traverses long geographic distances (e.g., across a continent, across an ocean, across multiple continents, or the like).

The present disclosure provides a direct pathway between the backend storage resources and the client. For example, to upload or download digital content into a CMS, the CMS can provide access credentials (e.g., an access token, a digital key, a signed uniform resource locator (URL), a hash value, or the like) to the client device. The client device can then use these access credentials to either download the file directly from the backend storage resources or upload the file directly to the backend storage resources. Where digital content is uploaded by the client device directly to the backend storage resources, the CMS can process the unloaded data from the backend storage resources and update the CMS accordingly.

FIG. 1 illustrates a conceptual overview of a system 100 that may generally be representative of a DAMS deployed at a data center, in/for which one or more techniques described herein may be implemented according to various embodiments. It is noted that although this figure depicts and describes a DAMS, the present disclosure, including the techniques to directly upload or download digital content to backend storage resources can be implemented on any type or configuration of CMS (e.g., ECM, MAM, DMS, WCMS, or the like). Examples are not limited in this context.

As depicted, system 100 contains a data center 110 and a client device 180 communicatively coupled via a network 190. Network 190 can be any network arranged to provide for the exchange of data between data center 110 and client device 180, such as, the Internet. Data center 110 contains a number of physical computing resources, such as, processing resources 112, memory resources 114, storage resources 116, and networking resources 118. These physical resources (or portions of these physical resources) are grouped and allocated to support a DAMS 120. Said differently, DAMS 120 is deployed on and executed by the physical computing resources of a data center 110. In some examples, portions of physical resources may be disaggregated or distributed (e.g., in different locations, provided by different Cloud service providers, or the like).

In general, processing resources 112 can be any hardware or circuitry arrange to execute or process instructions. For example, processing resources 112 could include central processing units, field programmable gate arrays, application specific integrated circuits, graphics processing units, or the like.

Memory resources 114 can include any hardware or circuitry arranged to store data. For example, memory resources 114 can include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), or the like.

Storage resources 116 can include any computer-readable medium arranged to store data. For example, storage resources 116 can include magnetic disks, solid-state disks, optical disks, or the like. It is noted, that either or both of memory resources 114 and storage resources 116 can store instructions, executable by processing resources 112, to cause data center 110 to behave as indicated in the instructions. In some examples, either or both or memory resources 114 and storage resources 116 can non-transitorily store such instructions.

Networking resources 118 can include hardware or circuitry arranged to communicate (e.g., send and/or receive) data or information elements via network 190. In some examples, networking resources 118 can be arranged to send and/or receive information elements (e.g., packets, or the like) via one or more communication protocols, such as, an Ethernet protocol, a high-performance computing (HPC) link-layer protocol, or the like.

In some examples, some or all of physical computing resources of data center 110 may be provided by Cloud service providers (e.g., Cloud computing providers, Cloud storage providers, or the like). For example, storage resources 116 may be provided by a Cloud storage service provider (e.g., Amazon® S3, Microsoft® Azure, Google® Cloud Storage, Rackspace® Cloud Storage, or the like).

Generally speaking, DAMS 120 operates to manage digital content 130. To manage digital content 130, the DAMS 120 employs a number of sub-systems, such as, applications 140 and databases 150. Applications 140 and databases 150 are employed to manipulate and/or manage digital assets 130. For example, an application 140 could be executed to convert a number of digital assets 130 of a first file type (e.g., .doc, JPG, or the like) to a second file type (e.g., .docx, GIFF, or the like). As another example, a database 150 could be configured to manage versioning, history, and indexing for digital assets 130. Applications 140 and/or databases 150 can be provided by multiple different providers, such as, for example, Oracle, PostgreSQL, Elasticsearch, MongoDB, Redis, Kafka, etc. Examples are not limited in this context and the concepts described herein to provide direct access by the client device 180 to the backend storage resources 116 of DAMS 120 can be implemented independent from the actual digital content 130 managed by the DAMS, or independent from the exact number, type, or configuration of the underlying sub-systems (e.g., applications 140, databases 150, etc.) employed by the DAMS 120 to manage the digital content 130.

It is important to note, that the digital content 130 can include multiple different types of files. Additionally, digital content 130 can be organized or stored in multiple different storage types, such as, for example, records, binary files, indexes, key/value pairs, etc. During operation, DAMS 120 can provide client device 180 access to digital content 130 or client device 180 can add digital content 130 to DAMS 120. Said differently, client device 180 can upload digital content 130 to DAMS 120 or can download digital content 130 from DAMS 120. Where digital content 130 is referenced herein, particularly in the context of uploading digital content 130 or downloading digital content 130 directly to the backend of DAMS 120, not all of the digital content 130 managed by DAMS 120 may be uploaded or downloaded. It is noted, that digital content 130 is depicted as a single block for purposes of convenience. However, examples are not limited in this context.

In general, client device 180 can be any computing device (e.g., a mobile device, a smart phone, a tablet computer, a laptop computer, a desktop computer, or the like). Client device 180 can include a processor 182, a memory 184, and a network interface 188. Processor 182 can be any hardware or circuitry arrange to execute or process instructions. For example, processor 182 could include a central processing unit, or the like. Memory 184 can include any hardware or circuitry arranged to store data. For example, memory 184 can include SDRAM, or the like. Networking interface 188 can include hardware or circuitry arranged to communicate (e.g., send and/or receive) data or information elements via network 190.

Memory 184 can store computer-readable instructions for a digital content access interface 186 and digital content 130. In general, processor 182 can execute digital content access interface 186 to directly access storage resources 116 to upload or download digital content 130 directly to storage resources 116. Said differently, processor 182, in executing digital content access interface 186 can directly access backend storage resources 116 for DAMS 120 to upload or download digital content 130.

DAMS 120 includes direct upload/download interface 160 that operates to provide client device 180 access to storage resources 116. In general, direct upload/download interface 160 can provision access credentials (depicted and discussed below) for client device 180 to directly access storage resources 116 to upload or download digital content 130 directly to storage resources 116. As noted above, in some examples, storage resources 116 are provided by a Cloud data provider. Often, such Cloud data providers have multiple geographic locations for access to storage resources 116, which can be accessed via a content delivery network (CDN) or Cloud storage front-end. Thus, client device 180 may potentially access storage resources 116 from a geographic point closer to client device 180 than DAMS 120. Furthermore, DAMS 120 may not remain idle or may process other tasks while client device 180 uploads or downloads digital content 130 as the uploading and downloading occurs directly onto the backend (e.g., storage resources 116 of data center 110). Said differently, the present disclosure provides that computing resources, conventionally dedicated to uploading and downloading digital content 130, can be "off-loaded" to the backend for DAMS 120, or to the data center 110 itself. Thus, the present disclosure provides that physical computing resources allocated to the DAMS 120 can be reduced and/or computational efficiency can be increased by directly uploading or downloading digital content 130 to or from the backend (e.g., storage resources 116).

Figure 2:
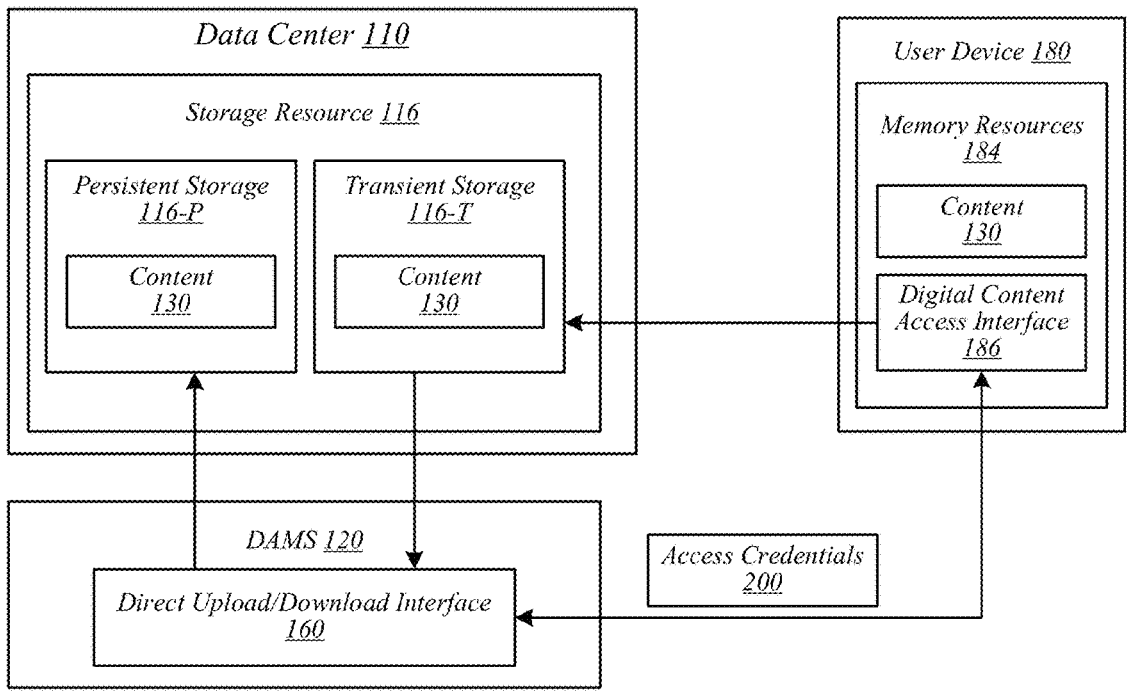
FIG. 2 illustrates a first embodiment of the example system of FIG. 1 in alternative detail.

FIG. 2 illustrates a portion of the system 100 of FIG. 1 in greater detail. In particular, this figure depicts a portion of datacenter 110, DAMS 120, and client device 180. In general, this figure depicts operations for client device 180 to upload digital content 130 to DAMS 120 via directly accessing the backend for DAMS 120, or directly accessing the storage resources 116 of data center 110.

During operation, client device 180 can send an indication of intent to upload digital content 130 to DAMS 120. For example, digital content access interface 186 (or processor 182 in executing digital content access interface 186) can send an information element to DAMS 120 including an indication of intent to upload digital content 130. With some examples, digital content access interface 186 operates to provide a user interface for a user of client device 180 to initiate uploading digital content 130 (e.g., via drag and drop, via file selection, or the like). Upon initiating uploading of digital content 130, digital content access interface 186 can send the indication of intent to upload digital content 130 to DAMS 120 as described above.

Responsive to this indication, direct upload/download interface 160 can initiate upload to storage resources 116 and provide access credentials 200 to client device 180. For example, direct upload/download interface 160 can provision a storage bucket, such as, for example, transient storage 116-T from storage resources 116 and generate access credentials 200 which provide access to transient storage 116-T.

With some examples, transient storage 116-T can be provisioned based on characteristics of the client device 180 (e.g., based on a geographic location of client device 180, based on a network access of client device 180, or the like). For example, if client device 180 is located in the European Union, transient storage 116-T can be provisioned from storage resources 116 located in the European Union, or most proximate to the European Union. It is noted, that transient storage 116-T can be provisioned from storage resources 116 in a geographic location irrespective of the geographic location of persistent storage resources 116-P. For example, transient storage 116-T can be provisioned from storage resources 116 in the European Union while persistent storage 116-P is provisioned from storage resources 116 in the United States. Examples are not limited in this context.

In some examples, access credentials 200 can be a hash value with which client device 180 can upload digital content 130 to transient storage 116-T and/or with which transient storage 116-T can verify the authenticity of the uploaded digital content 130.

Responsive to receiving the access credentials 200, client device 180 can upload digital content 130 directly to storage resources 116, such as, for example, to transient storage 116-T, which may be provisioned or allocated by DAMS 120 as described above. As noted above, a provider of storage resources 116 can have a front-end (e.g., a part of a CDN, or the like) to access transient storage 116-T. For example, where storage resources 116 are implemented using Amazon S3, client device 180 can access transient storage 116-T via Amazon Cloud-Front CDN. Thus, digital content access interface 186 can access transient storage 116-T using access credentials 200 and can directly upload digital content 130 to the transient storage 116-T, for example, via the CDN front-end for storage resources 116. In some examples, client device 180 can send an indication of a completed upload to DAMS 120.

Responsive to digital content 130 being uploaded to transient storage 116-T, DAMS 120 can replicate digital content 130 to persistent storage 116-P and "add" the digital content to DAMS 120 and/or processor the digital content through DAMS 120. For example, where the digital content 130 is a set of images, DAMS 120 can add indications of the images and any associated metadata to database 150 and move digital content 130 from transient storage 116-T to persistent storage 116-P. In some examples, persistent storage 116-P can be located in a different geographic region from transient storage 116-T. DAMS 120 can replicate digital content 130 from transient storage 116-T to persistent storage 116-P via networking resources of the data center 110, or for example, via networking resources of the Cloud data provider with which storage resources 116 are provided. Said differently, digital content 130 can be replicated from transient storage 116-T to persistent storage 116-P in the backend, thus, not utilizing physical computing resources allocated to the DAMS 120.

Figure 3:
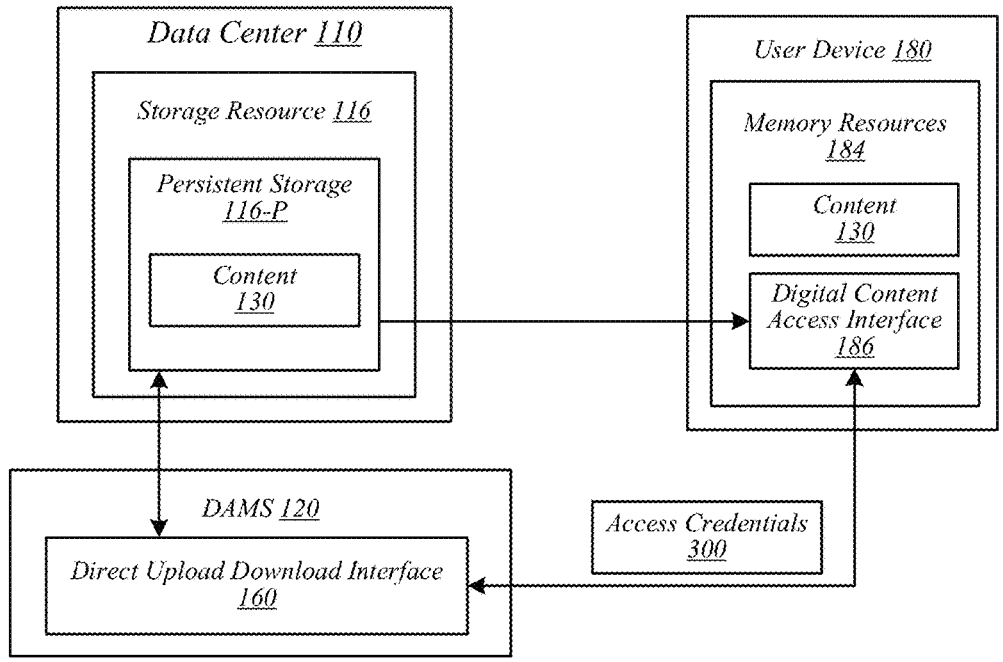
FIG. 3 illustrates a second embodiment of the example system of FIG. 1 in alternative detail.

FIG. 3 illustrates a portion of the system 100 of FIG. 1 in greater detail. In particular, this figure depicts a portion of data center 110, DAMS 120, and client device 180. In general, this figure depicts operations for client device 180 to download digital content 130 from DAMS 120 via directly accessing the backend for DAMS 120, or directly accessing the storage resources 116 of data center 110.

During operation, client device 180 can send, to DAMS 120, an indication of intent to download digital content 130 from DAMS 120. For example, digital content access interface 186 (or processor 182 in executing digital content access interface 186) can send an information element to DAMS 120 including an indication to download digital content 130 from DAMS 120.

Responsive to the indication, direct upload/download interface 160 can verify ownership and/or access rights of client device 180 to digital content 130, identify the requested digital content 130 in storage resources 116, and provide access credentials 300 to client device 180. In some examples, access credentials 300 can be a signed URL with security provisions (e.g., limited duration, limited usage, access from specific address network interface, or the like). With some examples, DAMS 120 can generate the signed URL and provide the signed URL in the form of a redirect to client device 180. In some examples, direct upload/download interface 160 can move digital content 130 from storage resources 116 (e.g., persistent storage resources 116-P) to a front-end for storage resources 116 (e.g., to a CDN for storage resources 116, or the like).

Responsive to receiving access credentials 300, client device 180 can access digital content 130 directly from the backend storage resources for DAMS 120, that is, directly from storage resources 116 of data center 110. For example, digital content access interface 186 can access digital content 130 from storage resources 116 (e.g., persistent storage 116-P, or the like). In a specific example, digital content access interface 186 can access digital content 130 via a CDN front-end using access credentials 300. The CND front-end can provide access to digital content 130 (e.g., on persistent storage 116-P, or the like) via the signed URL of access credentials 300.

Figure 4:
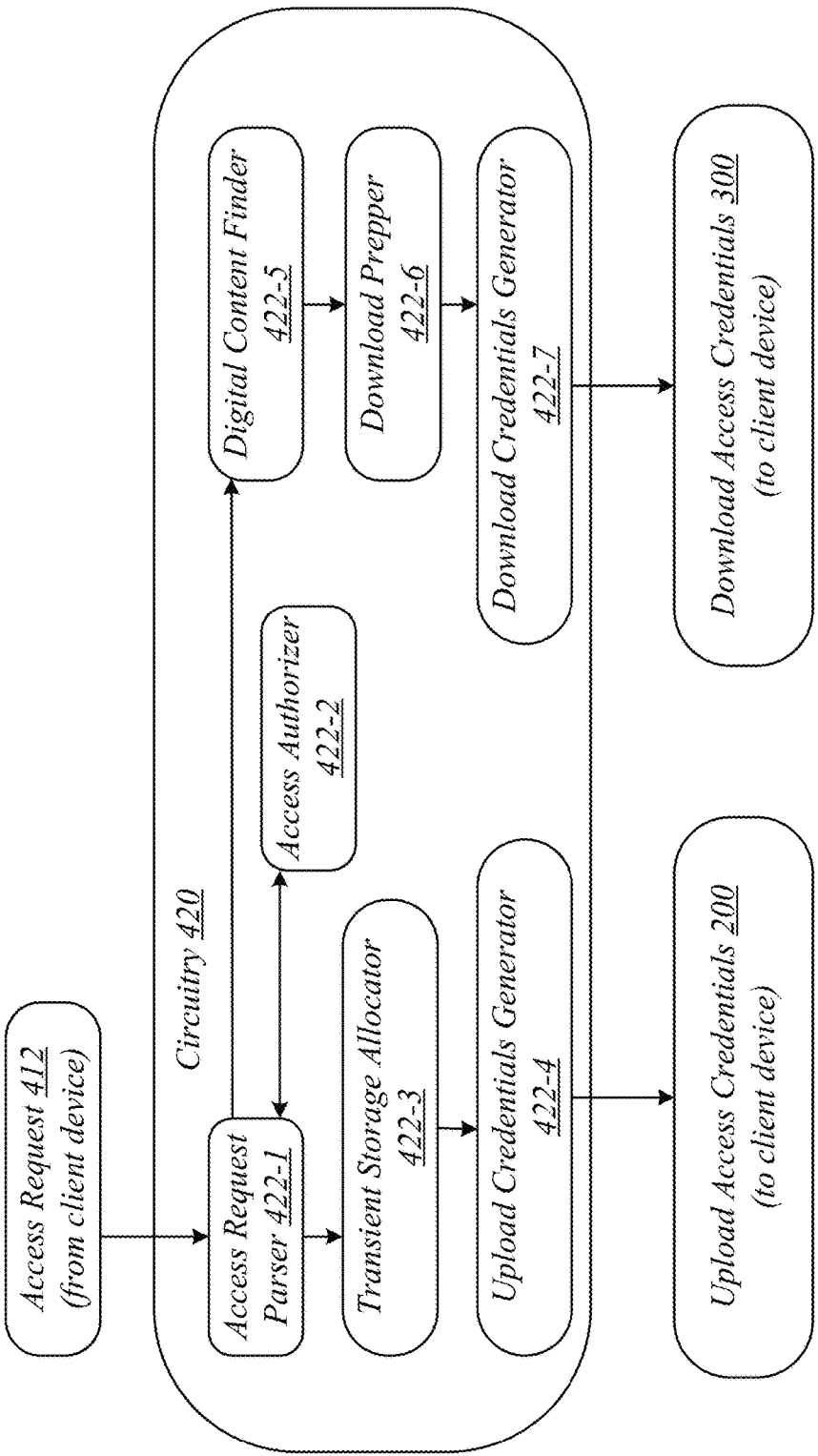
FIG. 4 illustrates an example direct upload/download interface for a DAMS.

FIG. 4 illustrates an example block diagram for a direct upload/download interface (DUDI) 400. DUDI 400 can be implemented as direct upload/download interface 160 of FIGS. 1-3. Although DUDI 400 shown in FIG. 4 has a limited number of elements in a certain topology, it may be appreciated that the DUDI 400 may include more or less elements in alternate topologies as desired for a given implementation.

According to some examples, DUDI 400 may be supported by hardware or circuitry 420 (e.g., processing resources 112, memory resources 114, or the like) of a data center, such as data center 110 of FIG. 1. Circuitry 420 may be arranged to execute one or more sets of instructions (e.g., software or firmware implemented modules or components) 422-*a*, where *a* is any positive integer. These sets of instructions can be software/firmware stored in computer-readable media. Although the components are shown in FIG. 4 as discrete boxes, this does not limit these components to storage in distinct computer-readable media components (e.g., a separate memory, etc.).

DUDI 400 can include an access request parser 422-1. In general, access request parser 422-1 can receive an access request 412 from a client device 180 and can determine whether the access request 412, received from a client device 180, is a request to upload digital content 130 to DAMS 120 or a request to download digital content 130 from DAMS 120.

DUDI 400 can include an access authorizer 422-2 arranged to determine whether client device 180 is authorized to access digital content. For example, access authorizer 422-2 can determine whether client device 180 is authorized to upload digital content 130 to DAMS 120. As another example, access authorizer 422-2 can determine whether client device 180 is authorized to access the requested digital content (e.g., can verify ownership, viewing rights, etc.). For example, access authorizer 422-2 can determine access rights for requested digital content 130 from a database 150 of DAMS 120, which indicates ownership and/or access rights for digital content 130.

In some examples, where access authorizer 422-2 determines that client device 180 does not have authorization for access to the requested content, access authorizer 422-2 can send an information element to client device 180 including an indication of insufficient rights for the requested access 412.

DUDI 400 can include a transient storage allocator 422-3 and an upload credentials generator 422-4. Transient storage allocator 422-3 can be arranged to provision transient storage 166-T buckets with which client device 180 can upload digital content directly to the backend storage resources 116 for DAMS 120. Upload credentials generator 422-4 can generate access credentials 200. For example, upload credentials generator 422-4 can generate a hash value to access transient storage resources 116-T via a CDN front-end for storage resources 116. Additionally, upload credentials generator 422-4 can provide the generated access credentials 200 to client device 180.

DUDI 400 can include digital content finder 422-5 arranged to identify and/or locate digital content 130 with which client device 180 has requested access to via access request 412. DUDI 400 can include download prepper 422-6 arranged to prep digital content for download by client device 180. For example, download prepper 422-6 can move digital content 130 into a front-end (e.g., CDN front-end) for storage resources 116 (or for persistent storage 116-P) such that client device 180 can access (or download) the digital content 130.

DUDI 400 can include download credentials generator 422-7 arranged to generate access credentials 300. For example, download credentials generator 422-7 can generate a signed URL (e.g., pointing to a location of digital content 130 within CDN front-end, or the like) and can provide the generated access credentials 300 (e.g., signed URL) to client device 180.

Figure 5:
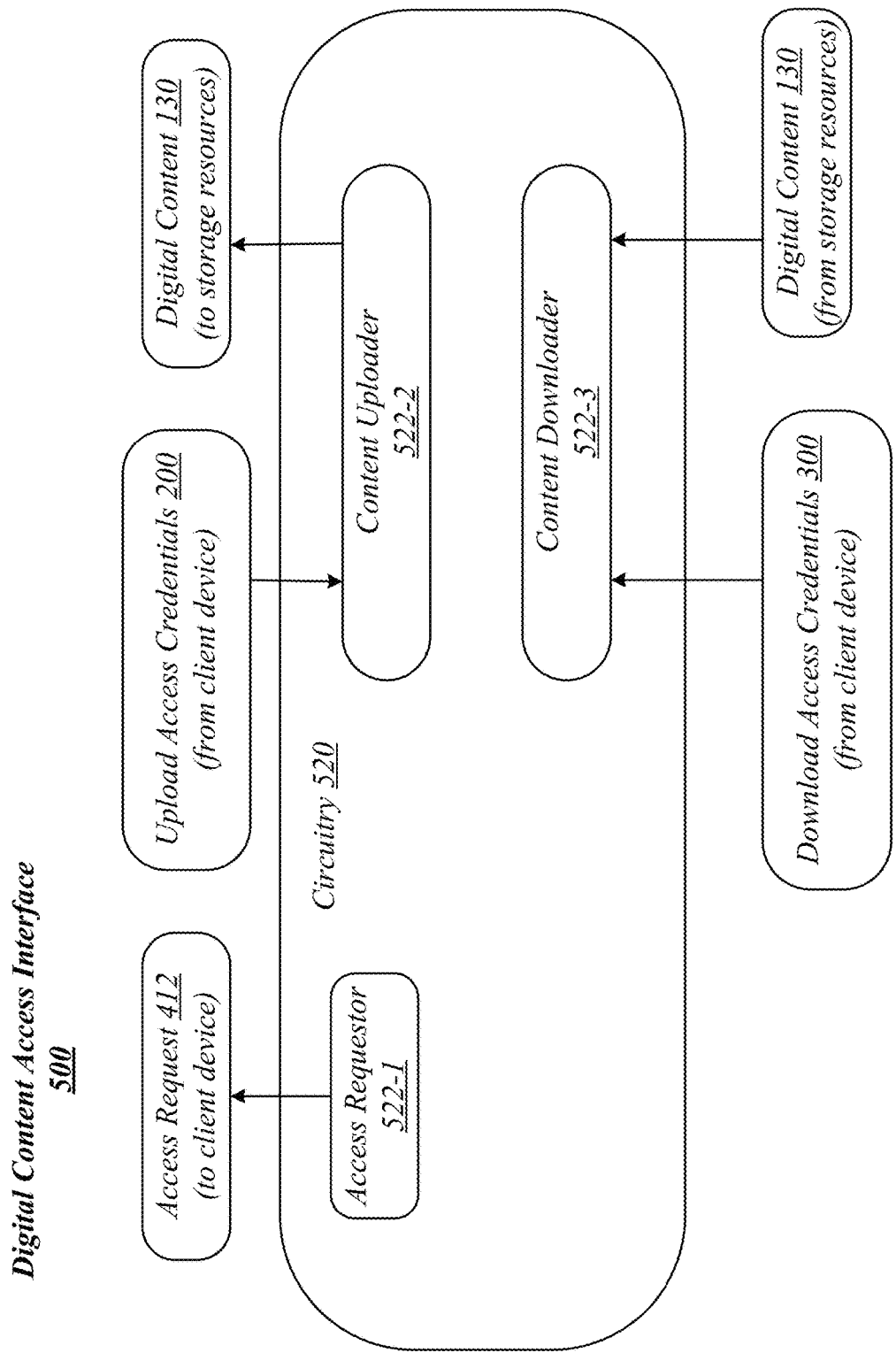
FIG. 5 illustrates an example digital content access interface for a client device.

FIG. 5 illustrates an example block diagram for a digital content access interface (DCAI) 500. DCAI 500 can be implemented as digital content access interface 186 of FIGS. 1-3. Although DCAI 500 shown in FIG. 5 has a limited number of elements in a certain topology, it may be appreciated that the DCAI 500 may include more or less elements in alternate topologies as desired for a given implementation.

According to some examples, DCAI 500 may be supported by hardware or circuitry 520 (e.g., processor 182, memory 184, or the like) of a client device, such as client device 180 of FIG. 1. Circuitry 520 may be arranged to execute one or more sets of instructions (e.g., software or firmware implemented modules or components) 522-*a*, where *a* is any positive integer. These sets of instructions can be software/firmware stored in computer-readable media. Although the components are shown in FIG. 5 as discrete boxes, this does not limit these components to storage in distinct computer-readable media components (e.g., a separate memory, etc.).

DCAI 500 can include access requestor 522-1. In general, access requestor 522-1 can request access to digital content 130 from DAMS 120. For example, access requestor 522-1 can request to download digital content 130 from DAMS 120. As another example, access requestor 522-1 can request to upload digital content 130 to DAMS 120.

DCAI 500 can include content uploader 522-2. In general, content uploader 522-2 can receive access credentials 200 and can upload digital content 130 directly to storage resources 116 for DAMS 120 based in part on the received access credentials 200. For example, content uploader 522-2 can receive access credentials 200 including a hash value for transient storage 116-T and can upload digital content to transient storage 116-T (e.g., via CDN front-end for transient storage 116-T, or the like) using access credentials 200 (e.g., the hash value).

DCAI 500 can include content downloader 522-3. In general, content downloader 522-3 can receive access credentials 300 and can download digital content 130 directly from storage resources 116 of DAMS 120 based in part on the received access credentials 300. For example, content downloader 522-3 can receive access credentials 300 including a signed URL and can download digital content 130 from storage 116 (e.g., persistent storage 116-P, a CDN front-end to storage resources 116, or the like) using the access credentials 300 (e.g., the signed URL).

Figure 6:
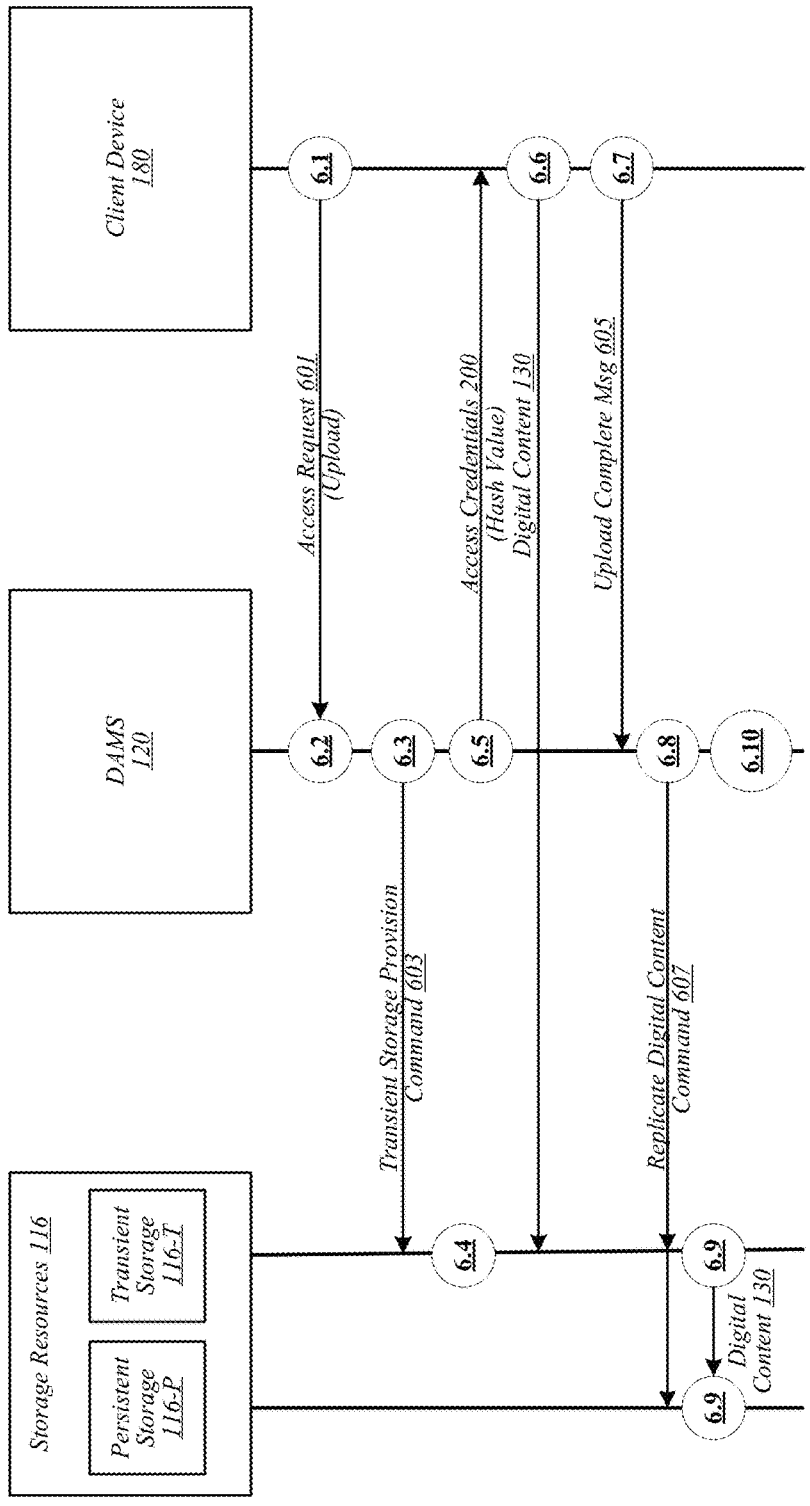
FIG. 6 illustrates a first example technique to directly upload digital content from a client device to backend storage resources for a DAMS.

FIG. 6 illustrates an example technique 600 for uploading digital content directly to backend storage resources for a DAMS. Technique 600 is described with reference to the DAMS 120 as depicted in FIGS. 1-3. However, it is noted, the techniques could be implemented to upload digital content to any CMS or type of CMS. Technique 600 can begin at 6.1. At 6.1, client device 180 can send an access request 601 to DAMS 120. For example, in executing digital content access interface 186 of client device 180, processor 182 can send access request 601 to DAMS 120. In some examples, access request 601 can be an information element with an indication to upload digital content 130 to DAMS 120.

At 6.2, DAMS 120 can receive access request 601 and can determine whether client device 180 is authorized to access DAMS 120 as requested. For example, DAMS 120 can determine whether client device 180 is authorized to upload digital content 130 to DAMS 120. At 6.3, DAMS 120 can sent a command 603 to storage resources 116 including an indication to provision transient storage 116-T. For example, responsive to a determination at 6.2 that the access request 601 is authorized, DAMS 120 can send command 603 to storage resources 116 to provision transient storage 116-T. At 6.4, storage resources 116 can provision transient storage 116-T. For example, a transient (e.g., limited duration, limited size, or the like) storage bucket can be provisioned from storage resources 116 as transient storage 116-T. In some examples, the command 603 can include an indication of a location (e.g., geographically, with respect to a network, or the like) of client device 180 and transient storage 116-T can be provisioned in a location proximate to client device 180.

At 6.5 DAMS 120 can generate access credentials 200 and can send access credentials 200 to client device 180. In some examples, access credentials 200 can include a hash value with which client device 180 can upload digital content 130 to transient storage 116-T. At 6.6, client device 180 can upload digital content 130 to transient storage 116-T. For example, client device 180 can upload digital content 130 to transient storage 116-T based in part on a hash value from access credentials 200 via a CDN front-end for storage resources 116.

At 6.7 client device can send an upload complete message 605 to DAMS 120. For example, client device 180 can send an information element including an indication that the upload of digital content 130 to transient storage 116-T is complete.

At 6.8 DAMS 120 can send a replicate digital content command 607 to storage resources 116. For example, responsive to receiving the upload complete message 605 from client device 180, DAMS 120 can sent command 607 including an indication to replicate digital content 130 from transient storage 116-T to persistent storage 116-P. At 6.9, storage resources 116 can replicate digital content 130 from transient storage 116-T to persistent storage 116-P.

At 6.10, DAMS 120 can process and/or update DAMS 120 based on digital content 130 uploaded by client device 180 and replicated to persistent storage 116-P. For example, DAMS 120 can update database(s) 150 (e.g., records, metadata, etc.) for digital content 130.

Figure 7:
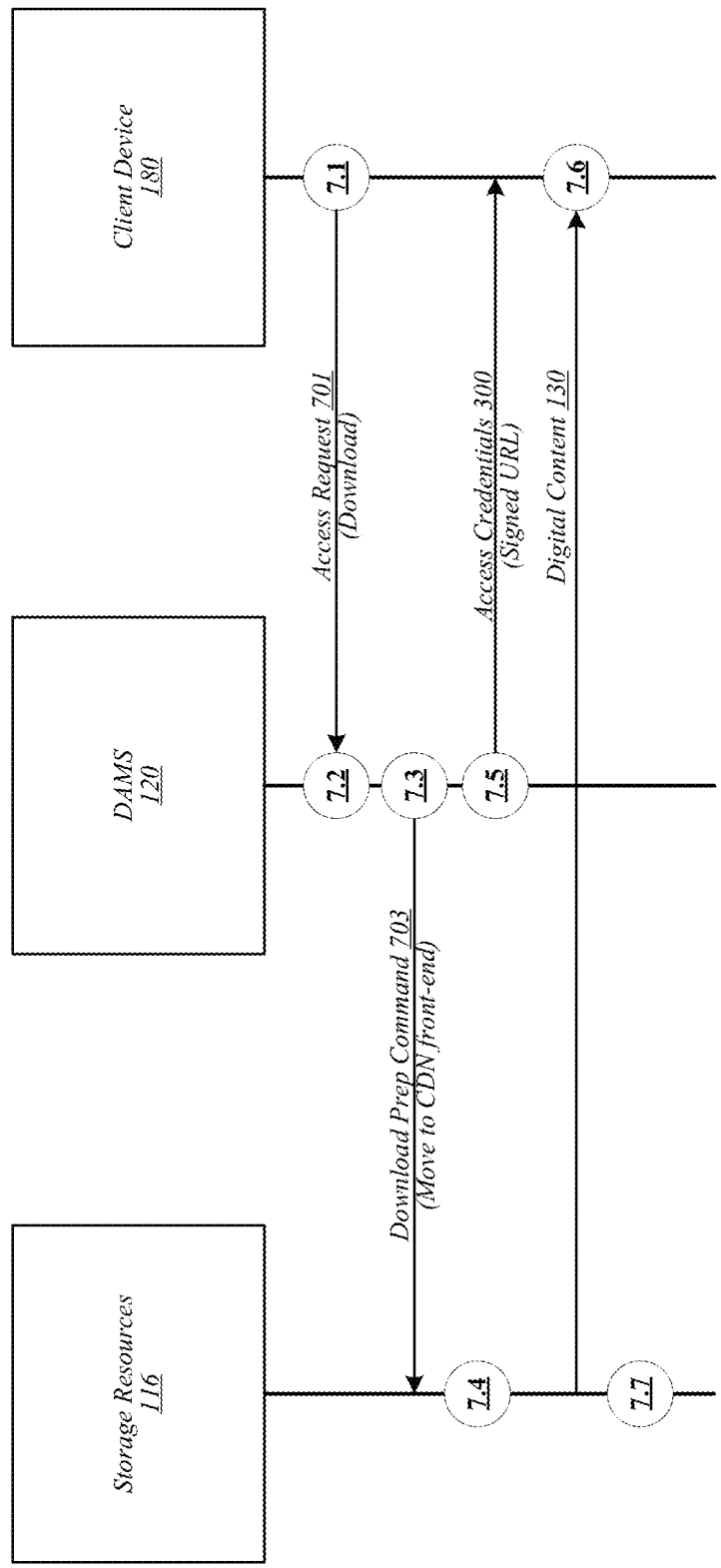
FIG. 7 illustrates a second example technique to directly download digital content from backend storage resources for a DAMS to a client device.

FIG. 7 illustrates an example technique 700 for downloading digital content directly from backend storage resources for a DAMS. Technique 700 is described with reference to the DAMS 120 as depicted in FIGS. 1-3. However, it is noted, the techniques could be implemented to download digital content from any CMS or type of CMS. Technique 700 can begin at 7.1. At 7.1, client device 180 can send an access request 701 to DAMS 120. For example, in executing digital content access interface 186 of client device 180, processor 182 can send access request 701 to DAMS 120. In some examples, access request 701 can be an information element with an indication to download digital content 130 from DAMS 120.

At 7.2, DAMS 120 can receive access request 701 and can determine whether client device 180 is authorized to access DAMS 120 as requested. For example, DAMS 120 can determine whether client device 180 is authorized to download digital content 130 from DAMS 120. At 7.3, DAMS 120 can send a command 703 to storage resources 116 including an indication to prepare digital content 130 for download. For example, responsive to a determination at 7.2 that the access request 701 is authorized, DAMS 120 can send command 703 to storage resources 116 to move digital content 130 into a CDN front-end for storage resources 116 and make digital content 130 available for download via a signed URL. At 7.4, storage resources 116 can prepare digital content 130 for download. For example, storage resources 116 can move digital content 130 into a CND front-end, can make digital content 130 accessible via a secure URL, or the like.

At 7.5 DAMS 120 can generate access credentials 300 and can send access credentials 300 to client device 180. In some examples, access credentials 300 can include a signed URL with which client device 180 can download digital content 130 from storage resources 116.

At 7.6, client device 180 can download digital content 130 from storage resources 116. For example, client device 180 can download digital content 130 via the signed URL of access credentials 300. At 7.7, storage resources 116 can remove access to digital content at the signed URL. For example, at 7.7, storage resources 116 can remove access to digital content via the signed URL based on client device 180 downloading digital content 130 at 7.6. In some examples, at 7.7, storage resources 116 can remove access to digital content via the signed URL based on expiration of a security provision (e.g., limited duration, or the like) of the signed URL.

FIGS. 8-11 depict example logic flows. These logic flows are representative of example methodologies for performing aspects of the disclosed architecture. While, for purposes of simplicity of explanation, the methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as, in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 8:
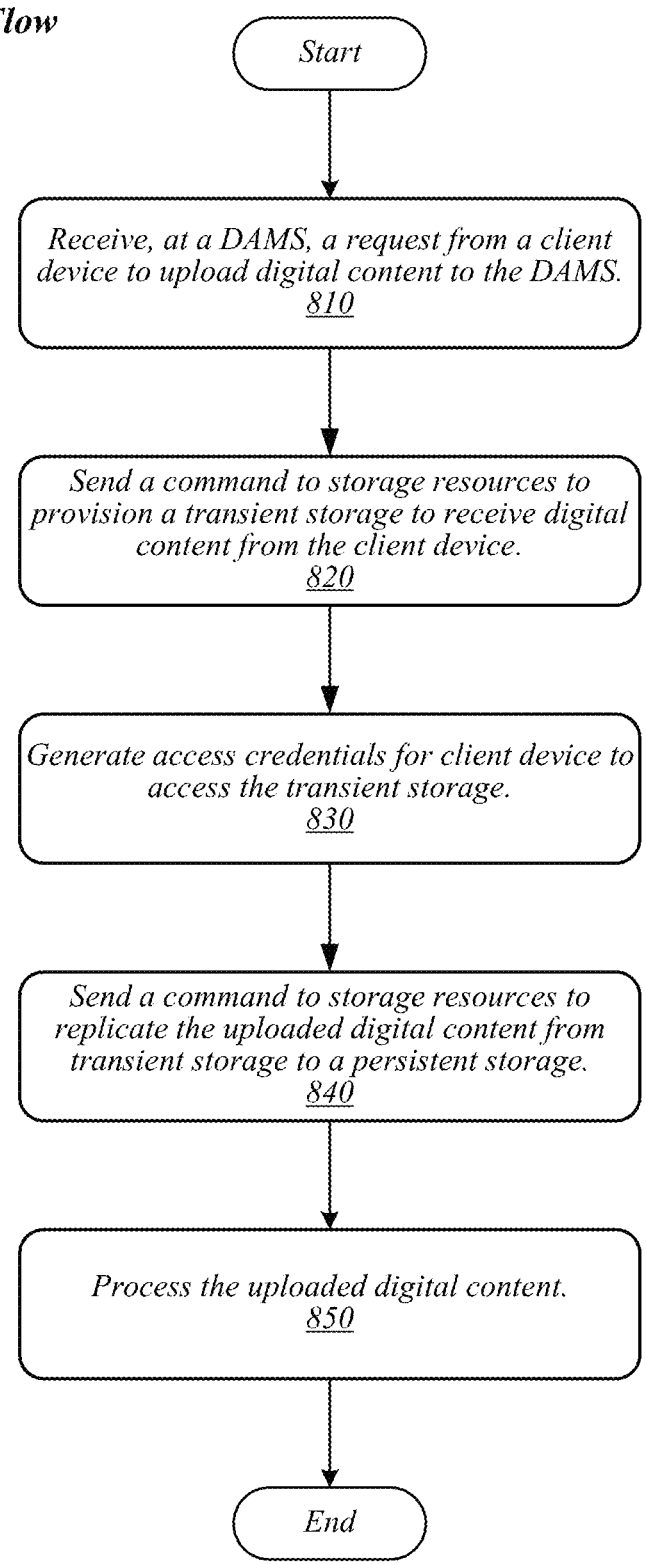
FIG. 8 illustrates a first example logic flow.

Turning to FIG. 8, which illustrates an example logic flow 800. Logic flow 800 may be representative of some or all of the operations executed by one or more logic, features, or devices described herein, such as direct upload/download interface 160, direct upload/download interface 400, or the like. For example, logic flow 800 may be implemented by DAMS 120 deployed on data center 110 to provide direct access to client devices to upload digital content to data center 110.

Logic flow 800 can begin at block 810. At block 810 "receive, at a DAMS, a request from a client device to upload digital content to the DAMS" a DAMS can receive a request to upload digital content to the DAMS from a client device. For example, DAMS 120 can receive a request to upload digital content 130 from client device 180. More specifically, direct upload/download interface 160 can receive a request (e.g., request 601, or the like) to upload digital content to DAMS 120 from client device 180.

Continuing to block 820 "send a command to storage resources to provision a transient storage to receive digital content from the client device" the DAMS can send a command to storage resources for the DAMS to provision a transient storage bucket to receive digital content from the client device. For example, DAMS 120 can send a command to storage resources 116 to provision transient storage 116-T to receive digital content 130 from client device 180. More specifically, direct upload/download interface 160 can send a command (e.g., command 603, or the like) to cause storage resources 116 to provision transient storage 116-T.

Continuing to block 830 "generate access credentials for client device to access the transient storage" the DAMS can generate access credentials for client device to directly upload the digital content to storage resources. For example, DAMS 120 can generate access credentials 200 with which client device 180 can directly upload digital content 130 to transient storage 116-T. More specifically, direct upload/download interface 160 can generate a hash value (or the like) to access transient storage 116-T and provide the hash value to client device 180.

Continuing to block 840 "send a command to storage resources to replicate the uploaded digital content from transient storage to a persistent storage" the DAMS can send a command to storage resources for the DAMS to cause the digital content uploaded to transient storage to be replicated to a persistent storage for the DAMS. For example, DAMS 120 can send a command to storage resources 116 to cause storage resources 116 to replicate digital content from transient storage 116-T to persistent storage 116-P. More specifically, direct upload/download interface 160 can send a command (e.g., command 607, or the like) to storage resources 116 to cause storage resources 116 to replicate digital content from transient storage 116-T to persistent storage 116-P.

Continuing to block 850 "process the uploaded digital content" the DAMS can process the digital content replicated to persistent storage 116-P. For example, DAMS 120 can process (e.g., add records, update records, update version history, update metadata, or the like) digital content 130 replicated from transient storage 116-T to persistent storage 116-P.

Figure 9:
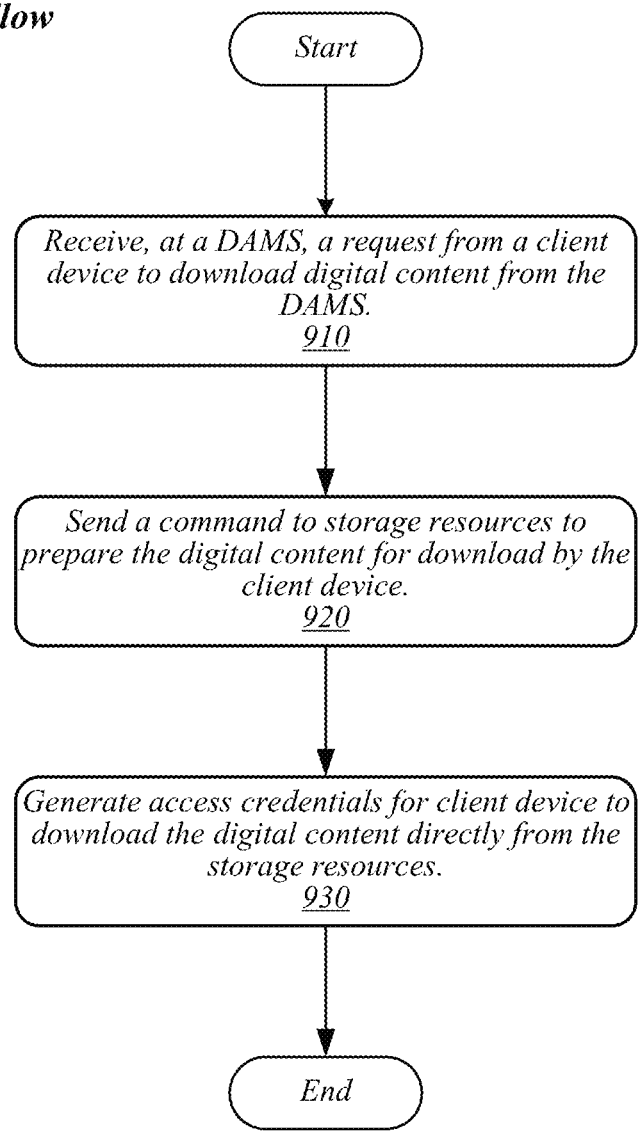
FIG. 9 illustrates a second example logic flow.

Turning to FIG. 9, which illustrates an example logic flow 900. Logic flow 900 may be representative of some or all of the operations executed by one or more logic, features, or devices described herein, such as direct upload/download interface 160, direct upload/download interface 400, or the like. For example, logic flow 900 may be implemented by at DAMS 120 deployed on data center 110 to provide direct access to client devices to download digital content from data center 110.

Logic flow 900 can begin at block 910. At block 910 "receive, at a DAMS, a request from a client device to download digital content from the DAMS" a DAMS can receive a request, from a client device, to download digital content from the DAMS to the client device. For example, DAMS 120 can receive a request from client device 180 to download digital content 130 from DAMS 120. More specifically, direct upload/download interface 160 can receive a request (e.g., request 701, or the like) to download digital content from DAMS 120 to client device 180.

Continuing to block 920 "send a command to storage resources to prepare the digital content for download by the client device" the DAMS can send a command to storage resources for the DAMS to cause the storage resources to prepare the digital content to be downloaded by the client device. For example, DAMS 120 can send a command to storage resources 116 to cause storage resources 116 to prepare (e.g. move into a CDN front-end, make available via a private URL, or the like) the digital content to be downloaded by the client device 180. More specifically, direct upload/download interface 160 can send a command (e.g., command 703, or the like) to storage resources 116 to cause storage resources 116 to prepare digital content 130 to be downloaded directly by client device 180.

Continuing to block 930 "generate access credentials for client device to download the digital content directly from the storage resources" the DAMS can generate access credentials for client device to directly download the digital content from the storage resources for the DAMS. For example, DAMS 120 can generate access credentials 300 with which client device 180 can directly download digital content 130 from storage resources 116. More specifically, direct upload/download interface 160 can generate a signed URL (or the like) with which client device can access storage resources 116 to download digital content 130.

Figure 10:
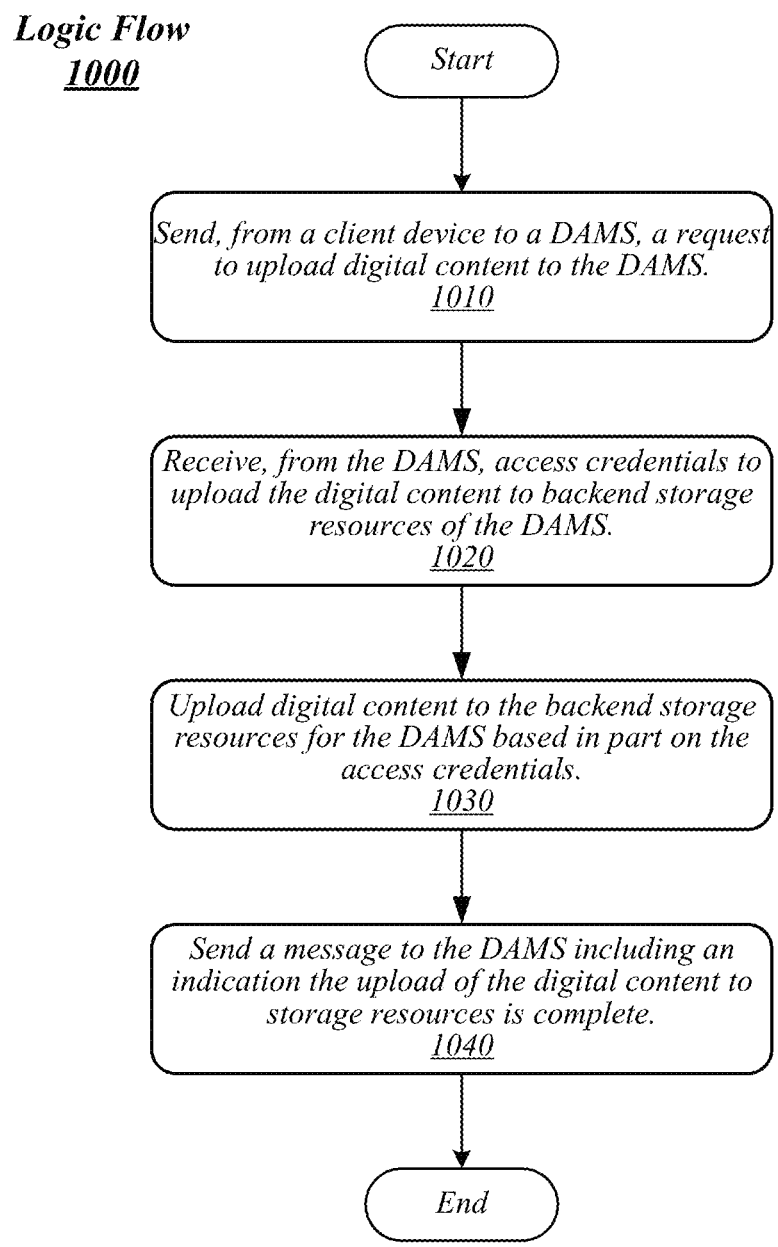
FIG. 10 illustrates a third example logic flow.

Turning to FIG. 10, which illustrates an example logic flow 1000. Logic flow 1000 may be representative of some or all of the operations executed by one or more logic, features, or devices described herein, such as digital content access interface 186, digital content access interface 500, or the like. For example, logic flow 1000 may be implemented by a client device 180 to upload digital content directly to backend storage resources 116 for DAMS 120.

Logic flow 1000 can begin at block 1010. At block 1010 "send, from a client device to a DAMS, a request to upload digital content to the DAMS" a client device can send a request to a DAMS to upload digital content to the DAMS. For example, client device 180 can send a request to DAMS 120 to upload digital content 130 from client device 180 to DAMS 120. More specifically, digital content access interface 186 can send a request (e.g., request 601, or the like) to upload digital content from client device 180 to DAMS 120.

Continuing to block 1020 "receive, from the DAMS, access credentials to upload digital content to backend storage resources for the DAMS" the client device can receive, from the DAMS, access credentials for client device to directly upload digital content to storage resources for the DAMS. For example, client device 180 can receive from DAMS 120 access credentials 200 with which client device 180 can directly upload digital content 130 to transient storage 116-T. More specifically, digital content access interface 186 can receive access credentials (e.g., a hash value, or the like) with which to directly upload digital content 130 to transient storage 116-T.

Continuing to block 1030 "upload digital content to the backend storage resources for the DAMS based in part on the access credentials" the client device can upload digital content directly to storage resources for the DAMS. For example, client device 180 can directly upload digital content 130 to storage resources 116 (e.g., transient storage 116-T, or the like) for DAMS 120. More specifically, digital content access interface 186 can directly upload digital content 130 to transient storage 116-T using access credentials 300.

Continuing to block 1040 "send a message to the DAMS including an indication that the upload of the digital content to storage resources is complete" client device can send a message to the DAMS to indicate the upload is complete. For example, client device 180 can send a message including an indication that upload of digital content 130 to storage resources 116 is complete. More specifically, digital content access interface 186 can send a message (e.g. message 605, or the like) to DAMS 120 including an indication that the upload of digital content 130 to transient storage 116-T is complete.

Figure 11:
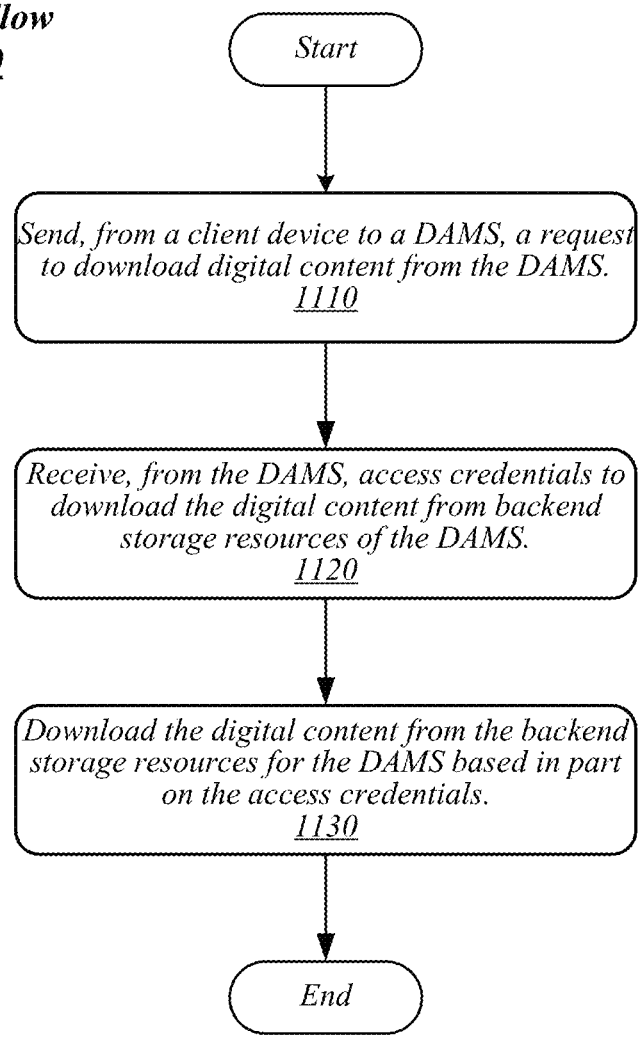
FIG. 11 illustrates a fourth example logic flow.

Turning to FIG. 11, which illustrates an example logic flow 1100. Logic flow 1100 may be representative of some or all of the operations executed by one or more logic, features, or devices described herein, such as digital content access interface 186, digital content access interface 500, or the like. For example, logic flow 1100 may be implemented by a client device 180 to download digital content directly from backend storage resources 116 of DAMS 120.

Logic flow 1100 can begin at block 1110. At block 1110 "send, from a client device to a DAMS, a request to download digital content from the DAMS" a client device can send a request to a DAMS to download digital content from the DAMS. For example, client device 180 can send a request to DAMS 120 to download digital content 130 from DAMS 120 to client device 180. More specifically, digital content access interface 186 can send a request (e.g., request 701, or the like) to download digital content 130 from DAMS 120 to client device 180.

Continuing to block 1120 "receive, from the DAMS, access credentials to download digital content from backend storage resources for the DAMS" the client device can receive, from the DAMS, access credentials for client device to directly download digital content from storage resources for the DAMS. For example, client device 180 can receive from DAMS 120 access credentials 300 with which client device 180 can directly download digital content 130 from storage resources 116. More specifically, digital content access interface 186 can receive access credentials 300 (e.g., a signed URL, or the like) with which to directly download digital content 130 from storage resources 116.

Continuing to block 1130 "download digital content from the backend storage resources for the DAMS based in part on the access credentials" the client device can download digital content directly from storage resources for the DAMS. For example, client device 180 can directly download digital content 130 from storage resources 116 for DAMS 120 using access credentials 300. More specifically, digital content access interface 186 can directly download digital content 130 from storage resources 116 using access credentials 300 (e.g., the signed URL, or the like).

Figure 12:
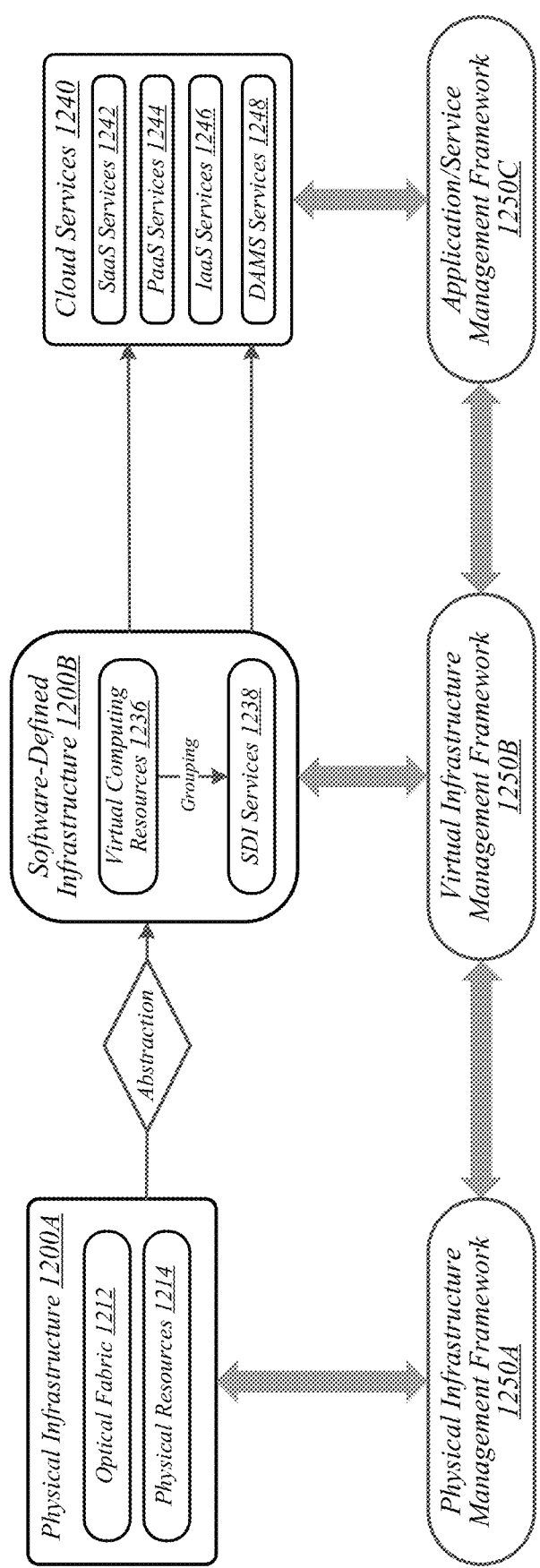
FIG. 12 illustrates an example data center.

FIG. 12 illustrates an example of a data center 1200 that may generally be representative of a data center on which one or more techniques described herein may be implemented according to various embodiments. As reflected in this figure, a physical infrastructure management framework 1250A may be implemented to facilitate management of a physical infrastructure 1200A of data center 1200. In various embodiments, one function of physical infrastructure management framework 1250A may be to manage maintenance functions within data center 1200. In some embodiments, physical infrastructure 1200A may feature an advanced telemetry system that performs telemetry reporting that is sufficiently robust to support remote management of physical infrastructure 1200A.

As depicted, the physical infrastructure 1200A of data center 1200 may comprise an optical fabric 1212 to provide connectivity among physical resources 1214. In some examples, physical resources 1214 can include processors, memory, storage, and networking interconnects.

In various embodiments, one or more layers of abstraction may be applied to the physical resources 1214 of physical infrastructure 1200A in order to define a virtual infrastructure, such as a software-defined infrastructure 1200B. In some embodiments, virtual computing resources 1236 of software-defined infrastructure 1200B may be allocated to support the provision of cloud services 1240. In various embodiments, particular sets of virtual computing resources 1236 may be grouped for provision to cloud services 1240 in the form of SDI services 1238. Examples of cloud services 1240 may include—without limitation—software as a service (SaaS) services 1242, platform as a service (PaaS) services 1244, infrastructure as a service (IaaS) services 1246, and digital asset management service (DAMS) services 1248.

In some embodiments, management of software-defined infrastructure 1200B may be conducted using a virtual infrastructure management framework 1250B. In various embodiments, virtual infrastructure management framework 1250B may be designed to implement workload fingerprinting techniques and/or machine-learning techniques in conjunction with managing allocation of virtual computing resources 1236 and/or SDI services 1238 to cloud services 1240. In some embodiments, virtual infrastructure management framework 1250B may use/consult telemetry data in conjunction with performing such resource allocation. In various embodiments, an application/service management framework 1250C may be implemented in order to provide QoS management capabilities for cloud services 1240.

Figure 13:
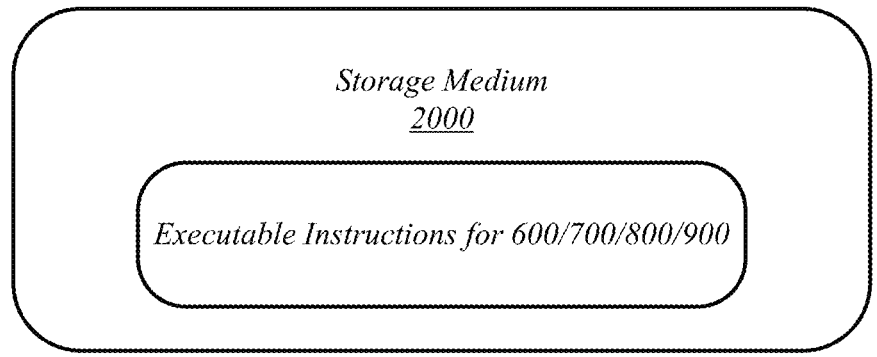
FIG. 13 illustrates an example of a storage medium.

FIG. 13 illustrates an example of a storage medium 2000. Storage medium 2000 may comprise an article of manufacture. In some examples, storage medium 2000 may include any non-transitory computer readable medium or machine readable medium, such as an optical, magnetic or semiconductor storage. Storage medium 2000 may store various types of computer executable instructions, such as instructions to implement technique 600, technique 700, logic flow 800, logic flow 900, logic flow 1000, and/or logic flow 1100. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
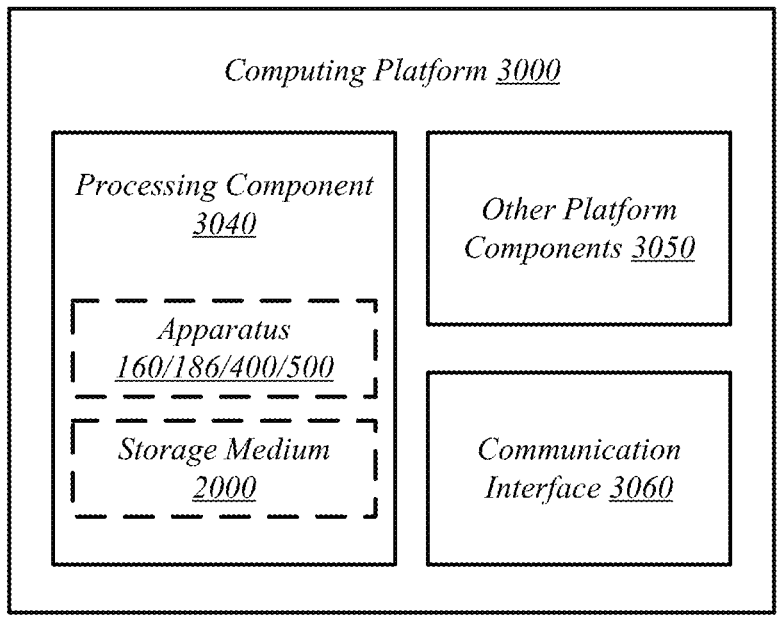
FIG. 14 illustrates an example computing platform.

FIG. 14 illustrates an example computing platform 3000. In some examples, as shown in this figure, computing platform 3000 may include a processing component 3040, other platform components or a communications interface 3060. According to some examples, computing platform 3000 may be implemented in a computing device such as a server in a system such as a data center or server farm that supports a manager or controller for managing configurable computing resources as mentioned above.

According to some examples, processing component 3040 may execute processing operations or logic for apparatus (e.g., interface, or the like) 160/186/400/500 and/or storage medium 2000. Processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 3000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 3000 described herein, may be included or omitted in various embodiments of computing platform 3000, as suitably desired.

The components and features of computing platform 3000 may be implemented using any combination of discrete circuitry, ASICs, logic gates and/or single chip architectures. Further, the features of computing platform 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The invention claimed is:

1. A content management system (CMS), comprising:
a processor;
an interconnect coupled to the processor; and
memory coupled to the processor, the memory comprising instructions that when executed by the processor, cause the processor to:
receive, via the interconnect, a request to access digital content at the CMS from a client device, the request comprising at least an indication to upload digital content to the CMS;
send a first command to storage resources for the CMS, the first command including an indication to provision one or more transient storage buckets based at least in part on a characteristic of the client device;
send a second command to the storage resources for the CMS, the second command including an indication to provision direct access to the one or more transient storage buckets by the client device;
generate access credentials for the client device to directly access the one or more transient storage buckets to access the digital content, the access credentials to include an indication of a location of the one or more transient storage buckets; and
send the access credentials to the client device via the interconnect.

2. The CMS of claim 1, the instructions when executed by the processor, cause the processor to:
generate the access credentials to include an indication of a hash value to use to upload the digital content to the one or more transient storage buckets.

3. The CMS of claim 2, the instructions when executed by the processor, cause the processor to:
receive, via the interconnect, an information element from the client device including an indication that the client device has uploaded the digital content to the one or more transient storage buckets; and
send, responsive to receiving the information element, a command to the storage resources to cause the storage resources to replicate the digital content uploaded by the client device to a persistent storage bucket on the storage resources.

4. The CMS of claim 3, the instructions when executed by the processor, cause the processor to process the uploaded digital content at the CMS.

5. The CMS of claim 4, the instructions when executed by the processor, cause the processor to update metadata for the uploaded digital content.

6. The CMS of claim 1, the request to access digital content including an indication to download digital content from the CMS, the instructions when executed by the processor, cause the processor to:
send the command to the storage resources to make the digital content available for download via a content delivery network (CDN) for the storage resources; and
generate the access credentials to include an indication of a signed uniform resource locator (URL) to use to download the digital content from the CDN.

7. The CMS of claim 6, the instructions when executed by the processor, cause the processor to send the access credentials to the client device and as a redirect to the signed URL.

8. The CMS of claim 1, the storage resources provided by a Cloud storage provider, the processor coupled to the storage resources via the interconnect.

9. The CMS of claim 1, the characteristic of the client device comprising a geographic location of the client device.

10. A method comprising:
receiving, at a content management system (CMS), a request to access digital content at the CMS from a client device, the request comprising at least an indication to upload digital content to the CMS;
sending a first command to storage resources for the CMS, the first command including an indication to provision one or more transient storage buckets based at least in part on a characteristic of the client device;

sending a second command to the storage resources for the CMS, the second command including an indication to provision direct access to the one or more transient storage buckets by the client device;

generating access credentials for the client device to directly access the one or more transient storage buckets to access the digital content, the access credentials to include an indication of a location of the one or more transient storage buckets; and sending the access credentials to the client device.

11. The method of claim 10, comprising:

generating the access credentials to include a hash value to use to upload the digital content to the one or more transient storage buckets.

12. The method of claim 11, comprising:

receiving an information element from the client device including an indication that the client device has uploaded the digital content to the one or more transient storage buckets; and sending, responsive to receiving the information element, a command to the storage resources to cause the storage resources to replicate the digital content uploaded by the client device to a persistent storage bucket on the storage resources.

13. The method of claim 12, comprising processing the uploaded digital content at the CMS.

14. The method of claim 10, the request to access digital content including an indication to download digital content from the CMS, the method comprising:

sending the command to the storage resources to make the digital content available for download via a content delivery network (CDN) for the storage resources; and generating the access credentials to include an indication of a signed uniform resource locator (URL) to use to download the digital content from the CDN.

15. The method of claim 14, comprising sending the access credentials to the client device and as a redirect to the signed URL.

16. The method of claim 10, the storage resources provided by a Cloud storage provider.

17. At least one non-transitory computer-readable storage medium comprising instructions that when executed by a processor of a content management system (CMS), cause the processor to:

receive a request to access digital content at the CMS from a client device, the request comprising at least an indication to upload digital content to the CMS;

send a first command to storage resources for the CMS, the first command including an indication to provision one or more transient storage buckets based at least in part on a characteristic of the client device;

send a second command to the storage resources for the CMS, the second command including an indication to provision direct access to the one or more transient storage buckets by the client device;

generate access credentials for the client device to directly access the one or more transient storage buckets to access the digital content, the access credentials to include an indication of a location of the one or more transient storage buckets; and send the access credentials to the client device.

18. The non-transitory computer-readable storage medium of claim 17, comprising instructions that when executed by the processor, cause the processor to:

receive an information element from the client device including an indication that the client device has uploaded the digital content to the one or more transient storage buckets; and send, responsive to receiving the information element, a command to the storage resources to cause the storage resources to replicate the digital content uploaded by the client device to a persistent storage bucket on the storage resources.

19. The non-transitory computer-readable storage medium of claim 18, comprising instructions that when executed by the processor, cause the processor to update metadata associated with the uploaded digital content or generate metadata associated with the uploaded digital content.

20. The non-transitory computer-readable storage medium of claim 17, the request to access digital content including an indication to download digital content from the CMS, the medium comprising instructions that when executed by the processor, cause the processor to:

send the command to the storage resources to make the digital content available for download via a content delivery network (CDN) for the storage resources; and generate the access credentials to include an indication of a signed uniform resource locator (URL) to use to download the digital content from the CDN.

21. The non-transitory computer-readable storage medium of claim 20, comprising instructions that when executed by the processor, cause the processor to send the access credentials to the client device and as a redirect to the signed URL.

22. The non-transitory computer-readable storage medium of claim 17, the storage resources provided by a Cloud storage provider.

* * * * *